United States Patent
Hsiang

[19]

[11] Patent Number: 6,068,511
[45] Date of Patent: May 30, 2000

[54] BY-PASS CONNECTOR OF CABLE TV MULTI-TAP

[75] Inventor: Tzu-Yen Hsiang, Taipei, Taiwan

[73] Assignee: Lantek Electronics Inc., Taiwan

[21] Appl. No.: 09/076,086

[22] Filed: May 12, 1998

[51] Int. Cl.[7] .................................................. H01R 9/05
[52] U.S. Cl. ........................... 439/579; 439/535; 174/59
[58] Field of Search .................................. 439/579, 578, 439/535; 307/147; 174/59

[56] References Cited

U.S. PATENT DOCUMENTS

| | | | |
|---|---|---|---|
| 3,989,333 | 11/1976 | Cauldwell | 439/579 |
| 5,677,578 | 10/1997 | Tang | 439/579 |

Primary Examiner—Paula Bradley
Assistant Examiner—Tho D. Ta
Attorney, Agent, or Firm—Smith, Gambrell & Russell, LLP

[57] ABSTRACT

A by-pass connector device of a multi-tap device installed within the multi-tap device, as the multi-tap device is exploded for repairing, it still can transfer the input signal. The by-pass connector device comprises a lower guide base shell; an upper guide base shell, an elastic reed, a damper, two conducting pillars, and two top plates. The assembly of the by-pass connector device is mainly completed by the engagement of the components, additional locking elements are not required. Thus it is easy to be assembled, and the by-pass connector device is formed as a device in normal closing conduction by pressing downwards. As the multi-tap device is exploded, by the contact of the elastic reed and the conducting pillars, the signal is transferred to the downstream.

2 Claims, 5 Drawing Sheets

BY-PASS CONNECTOR OF CABLE TV MULTI-TAP

BACKGROUND OF THE INVENTION

1. Field of the Invention

The present invention relates to an coaxial cable signal multi-tap device of cable TV, especially to a by-pass connector device within the cable TV multi-tap so that as the multi-tap device is dismount for repaire, the signal still can be transferred to the next one.

2. Description of the Prior Art

Referring to FIG. 1, a prior coaxial cable signal multi-tap device of cable TV includes an upper cover 10, a seat 20 and a by-pass connector 30, wherein at least one signal input port 21 and a signal output port 23 are installed on the seat 20. The bypass connector 30 on a position with respect to the ports 21 and 23 is fixedly locked on the seat 20. Two pins 31 and 33 are extendedly installed on the two sides of the by-pass connector 30, while the upper cover 10 having an outer appearance conforming the seat is connected with the periphery of the seat 20. A signal transferring circuit board 40 is assembled within the upper cover 10. A signal input receptacle hole 41 and a signal output receptacle hole 43 are installed on the circuit board 40 so that when the upper cover 10 and the seat 20 are locked together. The pins 31 and 33 of the by-pass connector are exactly engaged with the receptacle holes 41 and 43 of the circuit board 40. Thus, as the multi-tap device has received the signal, by the circuit board 40, the signal inputted the signal-input port 21 could be processed. Then, the signal has been processed by the circuit board 40 may further be transferred to next multi-tap device, meanwhile the signal will be transferred to subscriber's video device of the cable TV through the output port of the subscriber.

However, when the multi-tap device has faults, in repairing, the upper cover 10 and seat 20 will be separated, if it is required, the upper cover 10 must be updated, and then the new upper cover will be locked with the seat 20. Since when the upper cover 10 and seat 20 are separated, the signal can not transferred through the signal transferring circuit board 40 and the signal output port 23, thus the signal will be interrupted about one to two minutes. In the result, the right of the down stream subscriber has been encroached.

Although as shown in FIG. 2, in the other prior art, an elastic piece-fixing seat 50 is fixed on the by-pass connector 30. When the upper cover 10 and the seat 20 are separated, by the elastic piece 51 thereof contacting with the pins 31 and 33 of the by-pass connector 30, the signal can be transferred after separating. While the upper cover 10 and seat 20 are locked together, the receptacle hole 41 and 43 of the circuit board 40 is used to isolate the elastic piece 51 and pins 31 and 33. Thus, the signal will be transferred to the circuit board 40.

However, the above mentioned improvement still has some drawbacks. One is difficult to assemble; the other is its bad stability. Since in the prior improvement, an extra elastic piece-fixing seat is used to lock on the by-pass connector instead of being formed integrally. Moreover, since the number of assembling components of the elastic piece-fixing seat is large, the assembly becomes more complex. On the other hand, since the margin between the by-pass connector and the seat is small, the additional elastic piece-fixing seat will probably induce the elastic piece contacting the metal seat. If the above mentioned component are contacted with each other, it will make the signal transmitting short. Furthermore, in the prior by-pass connector, it is achieved by using the receptacle holes to isolate the pins conducting with the elastic piece. While the pins 31 and 33 are conducted with the elastic piece, there is just a line contact between them. Therefore, when the line contact has somewhat disconnection, it will induce the assembled multi-tap has poor stability.

SUMMARY OF THE INVENTION

Accordingly, the object of the present invention is to provide a novel by-pass connector device of a cable TV multi-tap device, in which the assembly of the by-pass connector is mainly completed by the engagement of the components. Thus, it is easy to be assembled without additional locking elements. Moreover, the by-pass connector is formed as a device of normal closing conduction by pressing downwards. As the multi-tap is dismounted, the whole surface of the elastic piece is contacted with the pin of the multi-tap. The position locating the elastic piece has a relative space between the seat of the multi-tap to reduce the signal-transmitting short happened, and even the elastic piece cloud be enclosed by an insulator to make the short not happened. Therefore, not only the stability and assembly of the prior multi-tap have been improved, but also the interruption of signal due to dismount the multi-tap has been resolved.

According to the object of the present invention, the present invention provides a by-pass connector device installed within a multi-tap device, as the multi-tap is dismounted for repairing, it still can transfer the input signal. The by-pass connector of present invention includes a lower guide base shell; an upper guide base shell installed on the lower guide base shell, and the upper guide base shell and the elastic reed being installed on the two sides of the lower guide base shell, respectively. While the elastic reed having two elastic pieces which are extended to the two conducting pillars positions; a damper engaged on the lower guide base shell for fixing the elastic reed; two conducting pillars located on the two conducting pillar positions and contacted with the elastic piece of the elastic reed, each of the conducting pillars having a convex pin projected to the outside of the upper guide base shell; and two top plates positioned on the upper guide base shell by inserting the pins of the two conducting pillar thereto, a first top pillar thereof being penetrated through the upper guide base shell to engage thereon for fixing; and a second top pillar being penetrated through the upper guide base shell and the lower guide base shell for resisting against the elastic piece of the elastic reed.

The present invention will be better understood and its numerous objects and advantages will become apparent to those skilled in the art by referencing to the following drawings in which:

DETAILED DESCRIPTION OF THE PREFERRED EMBODIMENT

Figure 1:
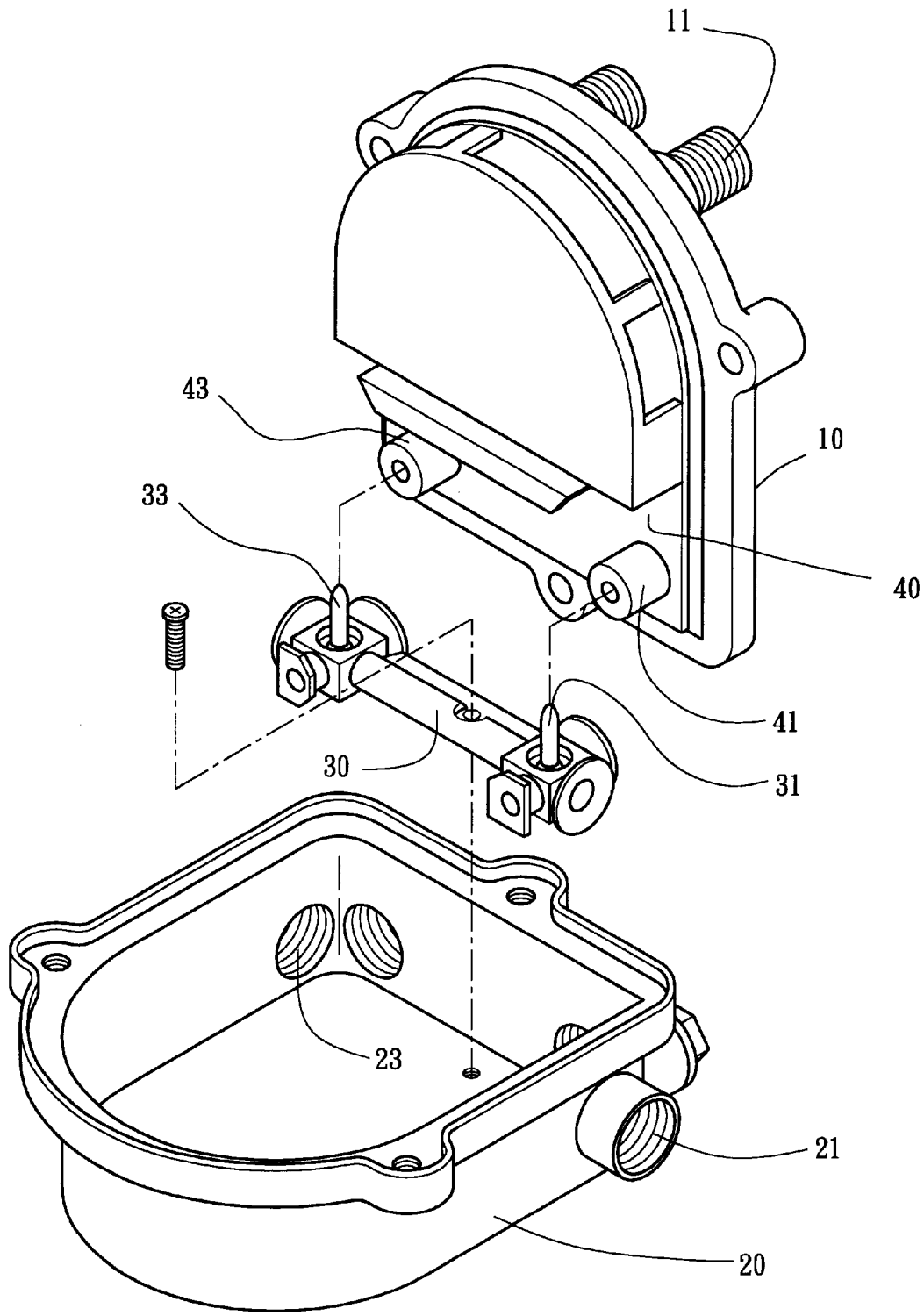
FIG. 1 shows a prior coaxial cable signal multi-tap device of cable TVs.
Figure 2:
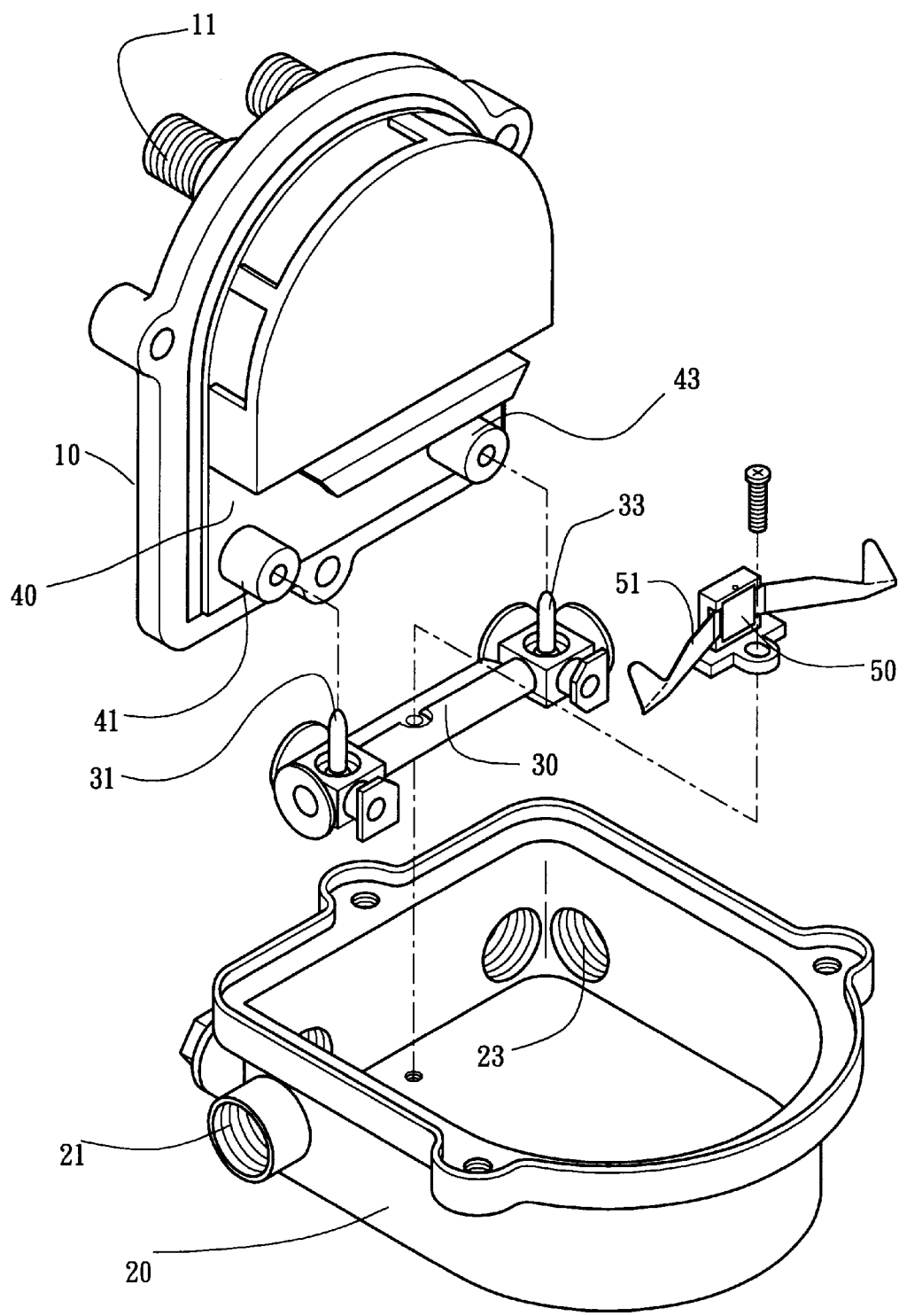
FIG. 2 shows an improvement coaxial cable signal multi-tap device of cable TV in the prior art.
Figure 3:
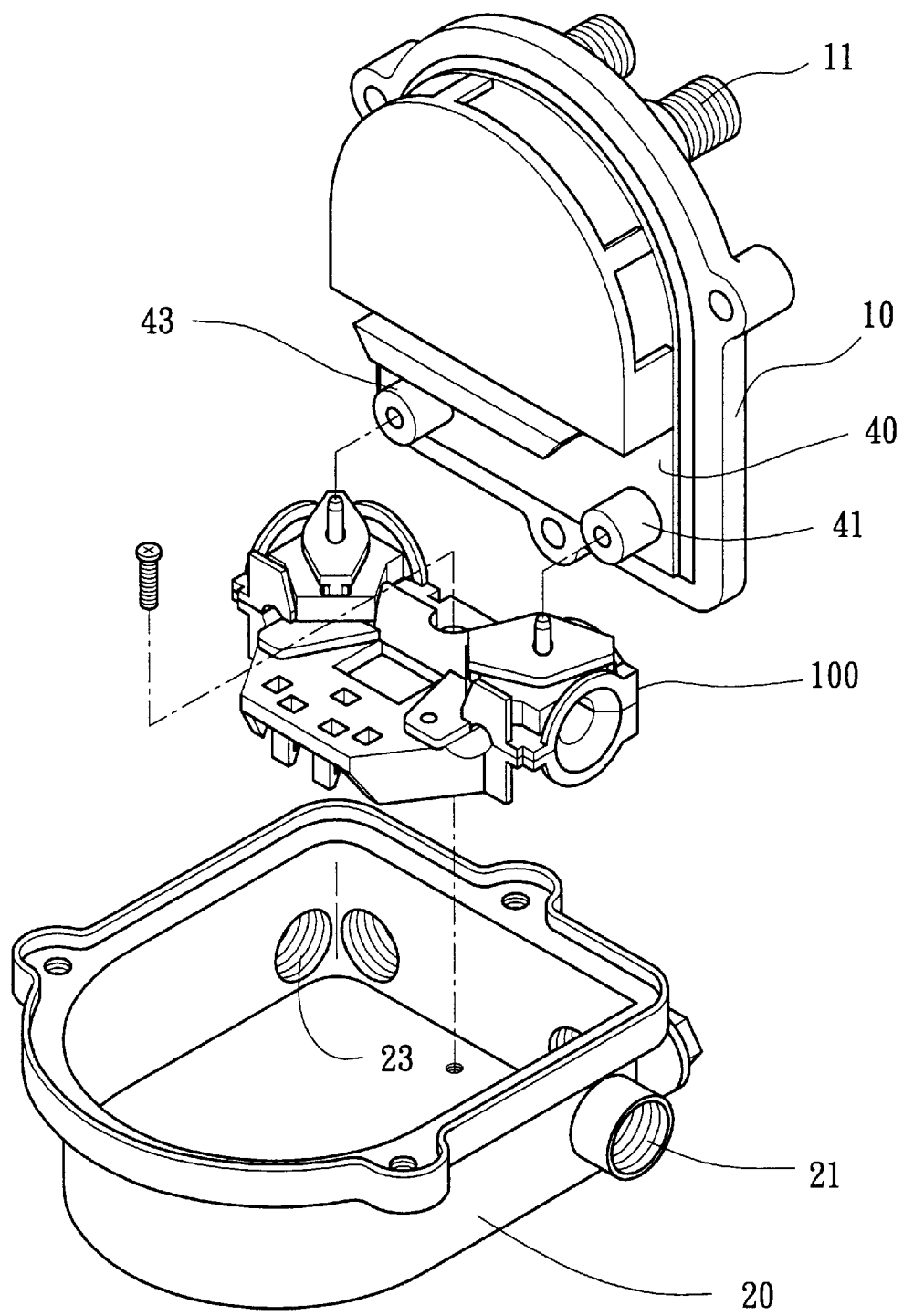
FIG. 3 shows a coaxial cable signal multi-tap device of cable TV having a by-pass connector device of the present invention.

Referring now to FIG. 3, the coaxial cable signal multi-tap device of an improvement cable TV in the present invention comprises an upper cover 10, a signal transferring circuit board 40, a by-pass connector device 100 and a seat 20. The upper cover 10 includes at least one output port 11 for the subscriber. The signal transferring circuit board 40 locked on the upper cover 10 includes two signal receptacle holes 41 and 43. The seat 20 locked with the upper cover 10 includes a signal input port 21 and a signal output port 23. The by-pass connector device 100 is locked on the seat 20.

Figure 4A:
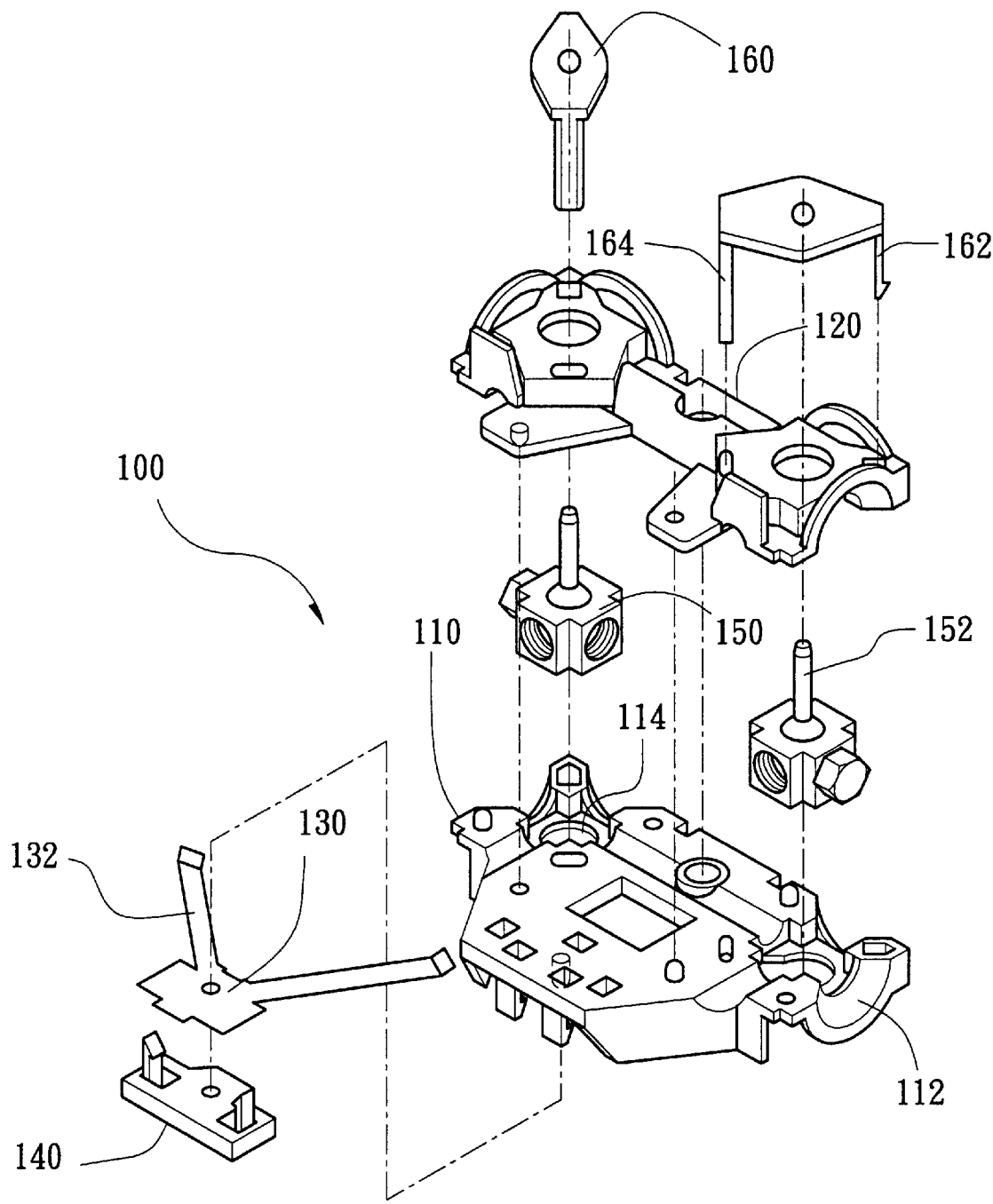
FIG. 4A is an exploded view of the components in by-pass connector device of the present invention.

Referring to FIG. 4A further, the exploded figure of the by-pass connector device in the present invention is shown. The by-pass connector device 100 of the present invention includes a lower guide base shell 110, an upper guide base shell 120, an elastic reed 130, a damper 140, two conducting pillars 150 and two top plates 160.

Figure 4B:
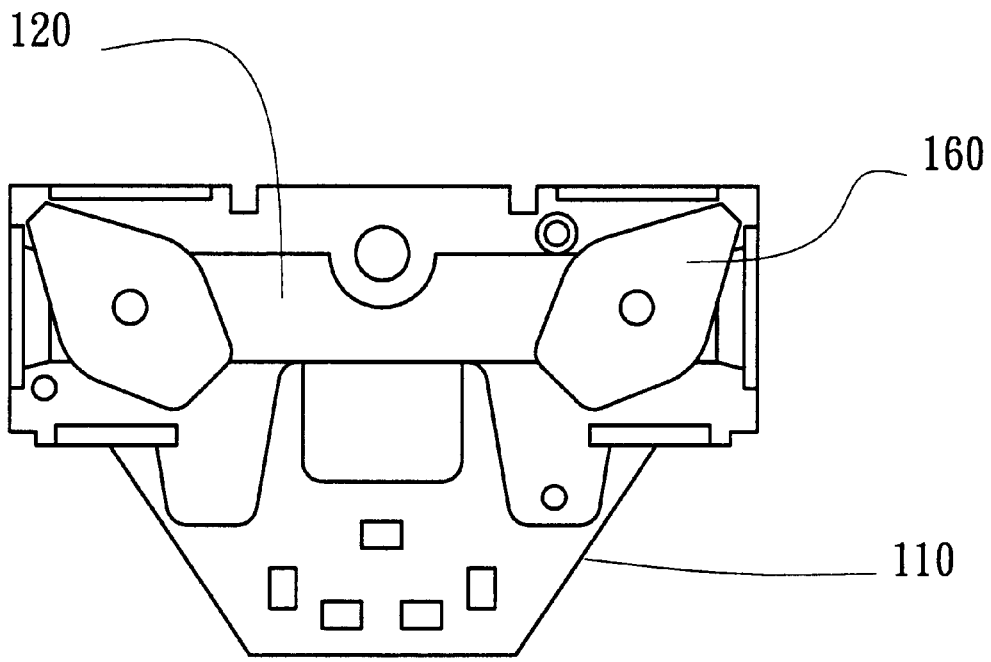
FIG. 4B is a front view of the by-pass connector device in FIG. 4A before assembled.

Referring to FIG. 4B, the front view of the by-pass connector device of FIG. 4A is depicted, wherein in the assembly of the by-pass connector device 100, the upper guide base shell 120 and the elastic reed 130 are installed on the two sides of the lower guide base shell 110, respectively. A channel 112 and two conducting pillar positions 114 are formed between the lower guide base shell 110 and the upper guide base shell 120. The elastic reed has two elastic pieces 132 which are extended to the two conducting pillar positions, respectively. The elastic reed 130 is fixed by using the damper 140 to engage on the lower guide base shell 110 and may be contacted with the elastic piece 132 of the elastic reed 130. Besides, each of the two conducting pillars 150 has a projected pin 152 extended to the outside of the upper guide base shell 120. The two top plates 160 are positioned on the upper guide base shell 120 by inserting the pins 152 of the two conducting pillar 150 thereto, a first top pillar 162 thereof being penetrated through the upper guide base shell 120 to engage thereon for fixing, and a second top pillar 164 penetrates through the upper guide base shell 120 and the lower guide base shell 110 for resisting against the elastic piece 132 of the elastic reed 130. Since the assembly of the by-pass connector device 100 is performed by the engagement of all the components, other locking elements are not required, and thus it is easily to be embodied.

Figure 4C:
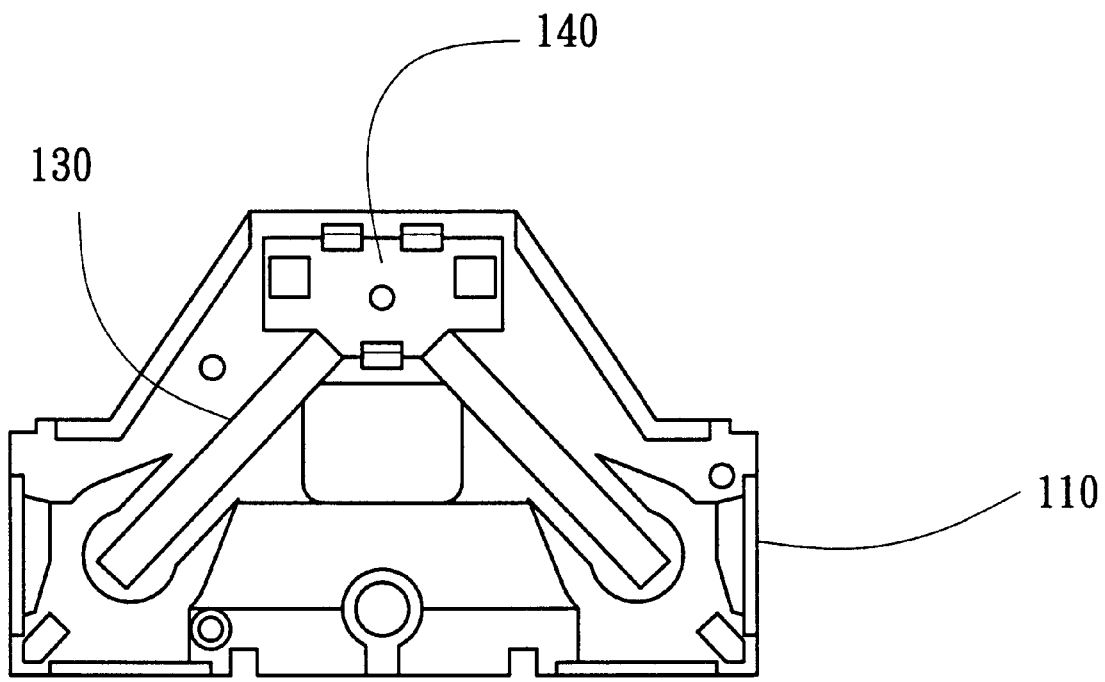
FIG. 4C is a rear view of the assembled by-pass connector device in FIG. 4A

Referring to FIG. 4C, the rear view of the by-pass connector device 100 is depicted. After combining with the by-pass connector device 100, the two elastic pieces 132 of the elastic reed 130 are contacted with the two conducting pillars 150, respectively. Therefore, when the upper cover 10 and the seat 20 are locked together, as shown in FIG. 3 the pins 152 of the two conducting pillar 150 of the by-pass connector device 100 will be inserted into the two signal receptacle holes 41 and 43 of the signal transferring circuit board 40, respectively and then to press the two top plates 160 so that the second top pillar 164 thereof will resist against the two elastic pieces 132 of the elastic reed 130, thus the elastic pieces 132 will not contact with the two conducting pillars 150. When the upper cover 10 is separated with the seat 20, the two elastic pieces 132 of the elastic reed 130 will press the two top plates 160 back to the original position so that the elastic pieces 132 will contact with the two conducting pillars 150. Therefore, during repairing the multi-tap device, the signal from the port 21 of the signal input end may be conducted through the elastic reed 130 and the conducting pillars 150 so that the signal may be output through the port 23 of the signal output end, accordingly, the signal will not be interrupted and the subscriber in the down stream will be protected.

Another, on the by-pass connector, a further insulating piece (not shown in Figure) covers the elastic reed 130 for isolating the elastic reed 130 and the seat 20. Therefore, the danger induced by the probable contact of the elastic reed 130 and the seat 20 is reduced.

In the present invention, the improvement of the multi-tap device of the by-pass connector device has the following advantages:

(1) Since the switch is controlled by the signal receptacle holes covering the pin of the conducting pillar, two signal loop will overlap for a very shot time as the signal transferring circuit board is inserted or removed so that the signal of the down stream viewer will not interrupted for a short time, because when the conducting plug of the circuit board is inserted into the conducting pillar, a proper inserting depth is required (i.e. the signal will has an overlap time) for resisting against the elastic reed so that the signal may be transferred successfully into the circuit board for processing. Inversely, when the conducting plug is removed from the pin of the conducting pillar, it has the same effect.

(2) Since the signal receptacle hole will move downwards to insert into the pin of the conducting pillar so to resist against the elastic piece, thus in assembly the elastic piece will not press sideward the conducting pillar as in the prior art so to slightly shift or change the central distance of the two conducting pillar to induce the problem that the circuit board is not easily inserted.

(3) Since in the multi-tap device of the present invention, the elastic reed is installed under the body of the multi-tap device, which is spaced with a further distance with the circuit board, thus the electronic property effected by the inductor of the elastic reed is reduced effective, and short circuit due to the contact of the elastic reed and the upper cover may be avoided, thus the stability of the multi-tap device can be improvement.

The various embodiments described above are provided by way of illustration only and should not be constructed to limit the invention. Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. A by-pass connector device installed within a multi-tap device, comprising:
   a lower guide base shell;
   an upper guide base shell mounted with the lower guide base shell for molding a channel and two conducting pillar positions inside the lower and the upper guide base shells;
   an elastic reed installed on the lower guide base shell, the upper guide base shell and the elastic reed being positioned on two sides of the lower guide base shell, respectively; while the elastic reed having two elastic pieces which are extended beneath to the two conducting pillar positions respectively;
   a damper, engaged on the lower guide base shell for fixing the elastic reed;
   two conducting pillars located on the two conducting pillar positions and contacted with the elastic piece of the elastic reed, each of the conducting pillars having a convex pin protruded to the outside of the upper guide base shell; and two top plates positioned on the upper guide base shell by inserting the pins of the two conducting pillars thereto, each of the top plates having a first top pillar and a second top pillar, the first top pillar being penetrated through the upper guide base shell to engage thereon for fixing; and the second top pillar being penetrated through the upper guide base shell and the lower guide base shell for resisting against the elastic piece of the elastic reed.

2. A coaxial cable signal multi-tap device for cable TV, comprising:

an upper cover having at least one output port for a subscriber;

a signal transferring circuit board installed on the upper cover having two signal receptacle holes and;

a base installed on the upper cover having a signal input port and a signal output port;

a by-pass connector installed on the seat having a lower guide base shell, an upper guide base shell, an elastic reed, a damper, two conducting pillars and two top plates;

whereby in the assembly of the by-pass connector, the upper guide base shell and the elastic reed are installed on the two sides of the lower guide base shell, respectively, and a channel and two conducting pillar positions are formed between the lower guide base shell and the upper guide base shell, the elastic reed has two elastic pieces which are extended to the two conducting pillar positions, respectively, the elastic reed is fixed by using the damper to engage on the lower guide base shell and may be contacted with the elastic pieces of the elastic reed, each of the two conducting pillars has a projected pin extended to the outside of the upper guide base shell, the two top plates are positioned on the upper guide base shell by inserting the pins of the two conducting pillars thereto, each of the top plates having a first top pillar and a second top pillar, the first top pillar being penetrated through the upper guide base shell to engage thereon for fixing, and a second top pillar penetrates through the upper guide base shell and the lower guide base shell for resisting against the elastic piece of the elastic reed.

* * * * *